April 26, 1932. G. HABER 1,855,573
DENTAL GAUGE
Filed March 19, 1926
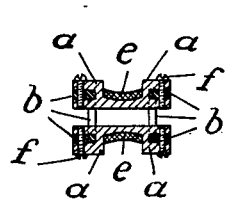
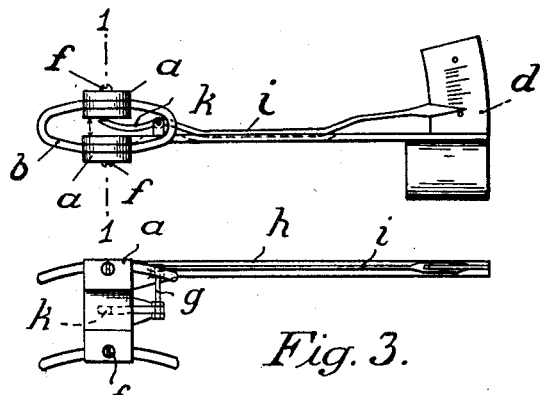
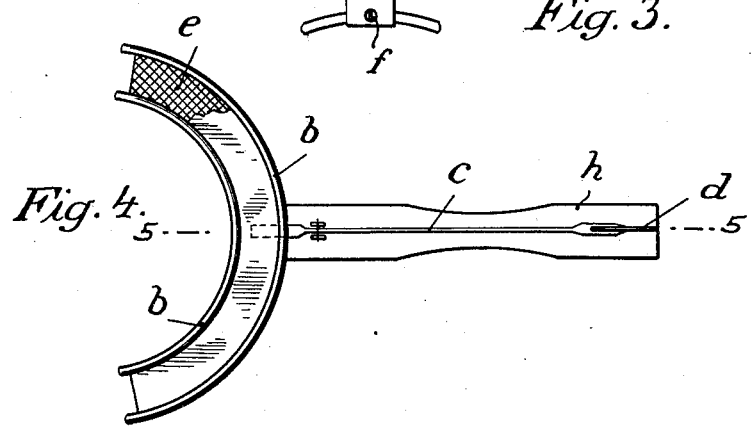
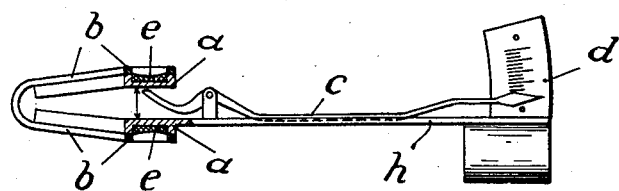
Inventor:
Gustav Haber Patented Apr. 26, 1932

1,855,573

UNITED STATES PATENT OFFICE

GUSTAV HABER, OF BERLIN, GERMANY

DENTAL GAUGE

Application filed March 19, 1926, Serial No. 95,906, and in Germany May 11, 1925.

My invention relates to gauges and is especially useful for dentists. The main object of my present invention is to provide an improved gauge for measuring the pressure caused by the teeth in chewing, which renders feasible an exact measurement of the pressure of a single tooth or of a group of teeth or of the whole row of teeth. The measurement is to be equally exact and it is immaterial whether the pressure of the teeth in the front or of the molar teeth has to be measured.

Another object for my invention is to provide a gauge which secures a bite as vertical as possible and prevents a slanting effect of the bite in measuring the biting pressure of the teeth.

Another object is to provide a gauge with an indicator which is located as far as possible outside the molar row and therefore does not prevent the setting of the teeth during the measurement of the pressure.

My invention will be more readily understood from the following description and the accompanying drawings which diagrammatically illustrate a preferred form of my invention. In the drawings—

Fig. 1 is a vertical sectional view of a dental gauge, the section being taken on the line 1—1 of Fig. 2.

Fig. 2 is a side elevation.

Fig. 3 is a top plan view.

Fig. 4 is a top plan view in which is shown a modification of structure; and

Fig. 5 is a fragmentary sectional view, some parts being in elevation, taken on the line 5—5 of Fig. 4.

Referring to Figs. 1, 2 and 3 $a, a,$ are a pair of members, which are shown in Fig. 3 as rectangular in outline and in Fig. 1 as having thereon open channel shaped grooves in the middle parts thereof and positioned symmetrically to each other, with said grooves facing outwardly thereof; said members $a, a,$ also have recesses in their ends centrally of the latter, for springs $b,$ which are hereinafter described, to be placed therein.

The breadth of said members $a, a,$ is equal to the width of the teeth, of which the biting pressure is to be measured.

The distance of said members $a, a$ from each other is such that they may be easily placed between the teeth to allow a strong bite. $e$ are cushion coatings of caoutchouc or any other suitable material. $b$ are two longitudinally curved loop elliptical tension springs the form of which being adapted to clear the row of teeth and which are flexed by the pressure of the teeth and which connect the grooved members or biting plates $a$ at opposite sides. $k$ is a lever placed in the middle between the plates which is movable according to the compression of the springs $b.$ At one end of a plate $a$ a projecting plate or arm $h$ is fixed in a suitable manner on that side which is located outside the row of teeth in using the apparatus. This plate $h,$ carries an index $d,$ and an indicator lever $i.$ The lever $k$ is operatively connected by means of a shaft $g$ with the indicator lever $i.$ $f$ are screws which connect the grooved members or biting plates $a$ with the springs in an easily detachable manner. Therefore it is possible to exchange without difficulty the plates $a$ if the dentist wishes to make different measurements with a number of teeth unusually large.

The apparatus of my invention can be made small enough, without impairing the accuracy of the measurements that it may be placed between the back-molar-teeth for measuring the bite.

In Figures 4 and 5 the grooved biting plates $a$ are of semi-circular form to accommodate an entire row of teeth. $e$ $e$ are the tooth cushions of caoutchouc or any other suitable material. $b$ is a spring the form of which corresponds to the form of a row of teeth or of the semi-circular plates. $c$ is an indicator lever, and $d$ an index.

I wish it to be understood that I do not desire to be limited to the exact details of construction, shown and described. For obvious modifications will occur to a person skilled in the art.

In either form of my invention when the pressure of the teeth on the pressure plates is released, the spring member moves away from the indicating means, the latter thereupon automatically resetting itself. That is to say, in Fig. 5, for instance, when the teeth are moved from $e$ and the upper member $a$, due to the release of compression on spring $b$, the upper spring-pressed plate $a$ moves away from the end of indicating lever $c$, the latter then promptly falls from raised position to position for a new reading. In other words, I have provided an automatic resetting indicating means in a tooth gauge.

What I claim as new and desire to secure by Letters Patent of the United States is:

1. In a dental pressure gauge a pair of biting-members, parallel elliptical springs for joining said members to each other, said springs normally keeping said members a suitable distance apart, said members with said joining springs thereon being arranged to be placed in the mouth of a person between the teeth, of whom the biting force is to be tested, said springs directly opposing said force, and an indicating means, connected to said members, for indicating by the displacement of said members the pressure of the bite exerted directly in opposition to said resilient means, said indicating means extending beyond said mouth, and said resilient means returning said members to their original position when the biting pressure thereon is removed.

2. In a dental pressure gauge a pair of biting members, parallel springs, for joining said members to each other, said springs normally keeping said members a suitable distance apart, said members with said springs thereon being arranged to be placed in the mouth of a person, between the teeth, of whom the biting force is to be tested, said springs directly opposing said force, and a means, connected to said members, for indicating by the displacement of said members the pressure of the bite exerted directly in opposition to said springs, said indicating means extending beyond said mouth, and said springs returning said members to their original position when the biting pressure thereon is removed.

3. In a dental pressure gauge a pair of biting members, elliptical springs, for joining said members to each other, said springs normally keeping said members a suitable distance apart, said members with said springs thereon being arranged to be placed in the mouth of a person, between the teeth, of whom the biting force is to be tested, said springs directly opposing said force, and a means, connected to said members, for indicating by the displacement of said members the pressure of the bite exerted directly in opposition to said springs, said indicating means extending beyond said mouth, and said springs returning said members to their original position when the biting pressure thereon is removed.

4. In a dental pressure gauge a pair of biting members, having therein open channel shaped grooves, facing outwardly thereof, to form seats for the teeth to be tested, the breadth of said grooves being equal to the width of said teeth, parallel elliptical springs longitudinally curved to clear said teeth and for joining said members to each other, said springs normally keeping said members a suitable distance apart, said members with said springs thereon being arranged to be placed in the mouth of a person, between the teeth, of whom the biting force is to be tested, said springs directly opposing said force, and an indicating means, connected to said members, for indicating by the displacement of said members the pressure of the bite exerted directly in opposition to said springs, said indicating means extending beyond said mouth, and said springs returning said members to their original positions when the biting pressure thereon is removed.

5. In a dental pressure gauge a pair of biting members, a tooth receiving groove in each of said members, substantially centrally thereof, said members being symmetrically placed with relation to each other, a pair of resilient members for joining the ends of said biting members to each other in a way to cause said biting members, when bitten, to move to positions which are substantially parallel to their original positions, said resilient members normally keeping said biting members a suitable distance apart, said biting members with said resilient members being arranged to be placed in the mouth of a person, between the teeth, of whom the pressure is to be tested, said resilient means directly opposing said force, and an indicating means, connected to said biting members, for indicating by the displacement of said biting members the pressure of the bite exerted directly in opposition to said resilient members, said indicating means extending beyond said mouth, and said resilient members returning said biting members to their original positions when the biting pressure thereon is removed.

6. In a dental pressure gauge a pair of spring supported biting members, movable toward each other by biting pressure thereon, to resume their original relative positions when said pressure is removed, a means for indicating the intensity of the pressure exerted on said biting members, said means comprising an index plate, mounted on and attached to one of said members and extending forwardly therefrom, an index on said index plate and an indicating lever, operatively connected to the other of said members.

7. A dental pressure gauge comprising in combination, a pair of grooved parallel biting plates, having recesses in the outer faces of their ends, resilient means in said recesses to resist biting pressure on said plates, an arm extending from one of said plates, an index supported at the outer end of said arm, a lever in contact with the underface of the upper biting plate and an indicator lever connected to oscillate with said lever when the plates are compressed, and having its outer end ranging over the index for indicating the biting pressure developed, the indicator lever adapted for gravitational return to the normal position when biting pressure is removed.

8. In a dental pressure gauge a pair of biting members, a resilient means for joining said members to each other, said means normally keeping said members a suitable distance apart, said members with said joining means thereon being arranged to be placed in the mouth of a person, between the teeth, of whom the biting force is to be tested, said means directly opposing said force, an outwardly extending index plate, secured at the inner end thereof to one of said biting members at the end of the latter, a spindle, having one end thereof rotatably mounted on said index plate and extending towards the center line of said members, a pressure receiving lever, centrally positioned with relation to said members, connected to the other end of said spindle and extending into contact with one of said members, to be moved thereby when said members are bitten, an index, secured to the outer end of said index plate, and an indicating lever, secured to the first mentioned end of said spindle, substantially in the plane of said index, to indicate thereon the pressure on said biting members.

9. In a dental pressure gauge a pair of biting members, a resilient means for joining said members to each other, said means normally keeping said members a suitable distance apart, said members with said joining means thereon being arranged to be placed in the mouth of a person between the teeth, of whom the biting force is to be tested, said means directly opposing said force, an outwardly extending index plate, secured at the inner end thereof to one of said members at the end of the latter, a pressure receiving lever, centrally positioned with relation to said members, rotatably mounted and extending into contact with one of said members, to be moved thereby when said members are bitten, an index, secured to the other end of said index plate, an indicating lever, operatively connected to said pressure receiving lever and positioned substantially in the plane of said index, to indicate thereon the pressure on said biting members, and a means for operatively connecting said levers to each other.

10. In a dental pressure indicating gauge, a pair of biting plates having tooth receiving grooves, cushion disposed in said grooves, elliptical springs secured to the said biting plates for supporting them in parallel spaced relation, said springs being parallel and longitudinally curved to conform to the curve of a row of teeth and to clear the same; and means contacting with a biting plate, for indicating the pressure exerted by a bite on said biting plates.

In witness whereof I have hereunto set my hand this 13th day of February, 1926.

GUSTAV HABER.